US012677744B2

(12) United States Patent
Marvin et al.

(10) Patent No.: US 12,677,744 B2
(45) Date of Patent: Jul. 14, 2026

(54) SYSTEMS AND METHODS FOR CHANGING A SPEED OF A BELT DRIVE SYSTEM

(71) Applicant: Deere & Company, Moline, IL (US)

(72) Inventors: Paul D. Marvin, Dewitt, IA (US); Logan K. Trueblood, Port Byron, IL (US)

(73) Assignee: DEERE & COMPANY, Moline, IL (US)

( * ) Notice: Subject to any disclaimer, the term of this patent is extended or adjusted under 35 U.S.C. 154(b) by 275 days.

(21) Appl. No.: 18/498,443

(22) Filed: Oct. 31, 2023

(65) Prior Publication Data

US 2025/0133998 A1      May 1, 2025

(51) Int. Cl.
*A01D 75/00* (2006.01)
*A01D 69/06* (2006.01)

(52) U.S. Cl.
CPC ............. *A01D 75/00* (2013.01); *A01D 69/06* (2013.01)

(58) Field of Classification Search
CPC ................................ A01D 75/00; A01D 69/06
See application file for complete search history.

(56) References Cited

U.S. PATENT DOCUMENTS

| | | | |
|---|---|---|---|
| 4,321,991 A | | 3/1982 | Teijido et al. |
| 6,834,228 B2 * | | 12/2004 | Serkh ...................... F02B 67/06 |
| | | | 123/195 A |
| 9,447,849 B1 | | 9/2016 | Edsinger et al. |
| 2008/0034720 A1 * | | 2/2008 | Helfrich ............... A01D 41/127 |
| | | | 56/10.2 R |
| 2015/0305240 A1 * | | 10/2015 | Gessel ................. A01D 45/025 |
| | | | 56/52 |

FOREIGN PATENT DOCUMENTS

| | | | | |
|---|---|---|---|---|
| CN | 104699131 A | * | 6/2015 | |
| CN | 112616435 A | * | 4/2021 | ............. A01D 69/00 |
| EP | 0926396 A1 | | 6/1999 | |
| EP | 4001695 A1 | * | 2/2022 | ............... F16H 7/08 |
| EP | 4124776 A1 | | 2/2023 | |

OTHER PUBLICATIONS

CN 112616435 A (with English translation attached) (Year: 2021).*
EP 4001695 A1 (Year: 2022).*
CN 104699131 A (Year: 2015).*
Marvin et al., Systems and Methods for Changing a Speed of a Belt Drive System, U.S. Appl. No. 18/498,401, filed Oct. 31, 2023, 36 pages (specification and drawings).
U.S. Appl. No. 18/498,401, filed Oct. 31, 2023.

* cited by examiner

*Primary Examiner* — Roy Rhee

(57) ABSTRACT

A computer-implemented method for automatically controlling a speed of an agricultural header operably connected to an agricultural machine may include determining whether a current gear setting of a transmission configured to drive the agricultural header is appropriate for an operating condition of the agricultural header; determining a load condition on the agricultural header; determining whether the load condition is an acceptable load condition; and changing a gear setting of the transmission based on the current gear setting being outside of an appropriate operating range and based on the load condition being the acceptable load condition.

20 Claims, 5 Drawing Sheets

SYSTEMS AND METHODS FOR CHANGING A SPEED OF A BELT DRIVE SYSTEM

FIELD OF THE DISCLOSURE

The present disclosure relates generally to belt drive systems.

BACKGROUND OF THE DISCLOSURE

Agricultural machines, such as combine harvesters, include belt drive systems that are used to transmit power from one rotating component to another. Power is transmitted from one rotating component to another via an endless belt. Tension in the endless belt is selected to transmit power without slippage of the endless belt over one or more pulleys in the belt drive system. Fixed speed belt drive systems are belt drive systems that exclude adjustable speed sheaves that alter a speed ratio of the endless belt based on a change in rotational speed of a driver pulley.

SUMMARY OF THE DISCLOSURE

An aspect of the present disclosure is directed to a computer-implemented method for automatically controlling a speed of an agricultural header operably connected to an agricultural machine. The method may include determining whether a current gear setting of a transmission configured to drive the agricultural header is appropriate for an operating condition of the agricultural header; determining a load condition on the agricultural header; determining whether the load condition is an acceptable load condition; and changing a gear setting of the transmission based on the current gear setting being outside of an appropriate operating range and based on the load condition being the acceptable load condition.

Another aspect of the present disclosure is directed to a computer-implemented apparatus for automatically controlling a speed of an agricultural header operably connected to an agricultural machine may include one or more processors and a non-transitory computer-readable storage medium coupled to the one or more processors and storing programming instructions for execution by the one or more processors, the programming instructions instruct the one or more processors to: determine whether a current gear setting of a transmission configured to drive the agricultural header is appropriate for an operating condition of the agricultural header; determine a load condition on the agricultural header; determine whether the load condition is an acceptable load condition; and change a gear setting of the transmission based on the current gear setting being outside of an appropriate operating range and based on the load condition being the acceptable load condition.

The various aspects may include one or more of the following features. Determining whether the current gear setting of the transmission configured to drive the agricultural header is appropriate for the operating condition of the agricultural header may include: receiving, from a speed sensor, a current ground speed of the agricultural machine and determining an ideal operating speed of the agricultural header based on the current ground speed of the agricultural machine. Determining whether the current gear setting of the transmission configured to drive the agricultural header is appropriate for the operating condition of the agricultural header may include: determining a range of operating speeds corresponding to a current gear setting of the transmission and determining whether the ideal operating speed is within the range of operating speeds. An error value representative of an amount by which the ideal operating speed is outside of the range of operating speeds may be determined in response to the ideal operating speed being outside the range of the operating speeds, and a new error sum value may be determined by summing the determined error value with a current error sum value. A need of a gear setting change may be determined when the new error sum value exceeds a selected value. A gear setting change may be determined as not needed when the ideal operating speed is within the range of operating speeds. Determining a load condition of the agricultural header may include determining a tension in an endless belt of a belt drive system operably coupled to the transmission. Determining the tension in an endless belt of a belt drive system operably coupled to the transmission may include determining a load applied to an idler pulley of the belt drive system by the endless belt. Determining the load applied to the idler pulley of the belt drive system by the endless belt may include sensing a fluid pressure of hydraulic fluid within a hydraulic cylinder connected to the idler pulley. Changing the gear setting of the transmission based on the current gear setting being outside of the appropriate operating range and based on the load condition being the acceptable load condition may include changing the gear setting of the transmission in response to a determination that an ideal operating speed of the transmission being outside of a range of operating speeds of a current gear setting of the transmission and a load condition of the agricultural header being less than a selected load level.

The various aspects of the present disclosure may include one or more of the following features. The programming instructions to instruct the one or more processors to determine whether the current gear setting of the transmission configured to drive the agricultural header is appropriate for the operating condition of the agricultural header may include programming instructions to instruct the one or more processors to: receive, from a speed sensor, a current ground speed of the agricultural machine; and determine an ideal operating speed of the agricultural header based on the current ground speed of the agricultural machine. The programming instructions to instruct the one or more processors to determine whether the current gear setting of the transmission configured to drive the agricultural header is appropriate for the operating condition of the agricultural header may include programming instructions to instruct the one or more processors to: determine a range of operating speeds corresponding to a current gear setting of the transmission; and determine whether the ideal operating speed is within the range of operating speeds. The programming instructions may instruct the one or more processors to: determine an error value representative of an amount by which the ideal operating speed is outside of the range of operating speeds in response to the ideal operating speed being outside the range of the operating speeds; and determine a new error sum value by summing the determined error value with a current error sum value. The programming instructions may instruct the one or more processors to determine that a gear setting change is needed when the new error sum value exceeds a selected value. The programming instructions may instruct the one or more processors to determine that a gear setting change is not needed when the ideal operating speed is within the range of operating speeds. The programming instructions that instruct the one or more processors to determine a load condition of the agricultural header may include programming instructions that instruct the one or more processors to determine a tension in an endless belt of a belt drive system operably coupled to the transmission. The programming instructions that instruct the one or more processors to determine the tension in an endless belt of a belt drive system operably coupled to the transmission may include programming instructions that instruct the one or more processors to determine a load applied to an idler pulley of the belt drive system by the endless belt. The programming instructions that instruct the one or more processors to determine the load applied to the idler pulley of the belt drive system by the endless belt may include programming instructions that instruct the one or more processors to sense a fluid pressure of hydraulic fluid within a hydraulic cylinder connected to the idler pulley. The programming instructions that instruct the one or more processors to change the gear setting of the transmission based on the current gear setting being outside of the appropriate operating range and based on the load condition being the acceptable load condition may include programming instructions that instruct the one or more processors to change the gear setting of the transmission in response to a determination that an ideal operating speed of the transmission being outside of a range of operating speeds of a current gear setting of the transmission and a load condition of the agricultural header being less than a selected load level.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

Figure 1:
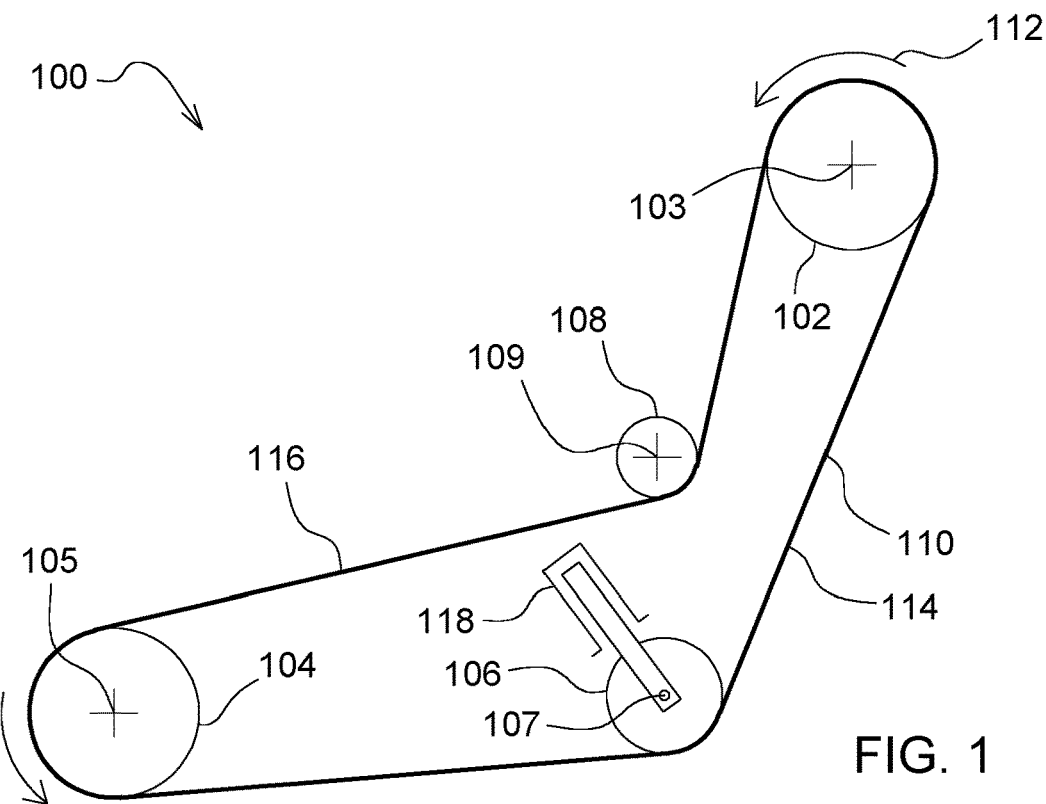
FIG. 1 is a side view of an example fixed speed belt drive system, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, systems, or methods and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to belt drive systems and methods. Particularly, the present disclosure describes fixed speed belt drive systems that include a load sensor whose output is indicative of tension in an endless belt of the belt drive system. However, the scope of the disclosure is not so limited, and, consequently, the apparatuses, systems, and methods described herein are applicable to other belt drive systems. The sensed belt tension, via the load sensor, is used to control a shifting operation of a gearbox connected to the belt drive system. In order to reduce harsh shifting of the gearbox during operation of the belt drive system (as well as to reduce wear and sudden, abrupt loading during shifting), the present disclosure also include methods, including automated methods, for controlling when shifting occurs using belt tension. In some implementations, the belt tension is determined using the load sensor.

The present description includes examples in the context of agricultural combine harvesters. However, these examples are not intended to limit the scope to which the apparatuses, systems, and methods described herein are applicable. Rather, these apparatuses, systems, and methods are applicable to other types of equipment, including other types of agricultural equipment as well as other types of equipment in other types of industries.

FIG. 1 is a side view of an example belt drive system 100. In this example, the belt drive system 100 is a fixed speed belt drive system. However, as indicated earlier, other belt drive systems, such as adjustable speed belt drive systems are within the scope of the present disclosure. The belt drive system 100 includes a driver pulley 102, a driven pulley 104, an idler pulley 106, a tensioner pulley 108, and an endless belt 110 that engages each of these pulleys 102, 104, 106, and 108. Other fixed speed belt drive systems within the scope of the present disclosure may include other configurations. For example, in other implementations, a belt drive system within the scope of the present disclosure may include additional driven pulleys. Each of the pulleys 102, 104, 106, and 108 has a fixed diameter, making the belt drive system 100 a fixed speed belt drive system. Consequently, the belt drive system 100 lacks one or more pulley sheaves that alters an effective diameter of the pulley in response, for example, to an input to alter in speed, e.g., to alter an effective diameter change of one or more of the pulleys, of the belt drive system. Consequently, for a fixed speed belt drive system, a speed ratio of the driver pulley versus the driven pulley remains constant irrespective of a rotational speed of the belt drive system. That is, the speed ratio of the driver pulley versus the driven pulley remains constant regardless of the rotational speed of the driver pulley. Further, each of the pulleys 102, 104, 106, and 108 is rotatable about a respective axis 103, 105, 107, and 109.

The driver pulley 102 is driven by a power source, such as an engine, a motor (e.g., an electric motor or hydraulic motor), or a shaft driven directly or indirectly by a power source. In some implementations, the driver pulley 102 is coupled to a transmission that is operable to adjust a speed of the driver pulley 102, such as by shifting the transmission, which results in altering a gear setting of the transmission. The driven pulley 104 is connected to another component or system for which power is to be transmitted from the driver pulley 102. For example, in some instances, a driven pulley 104 is connected to a feederhouse drive system of a combine harvester. As a result, power transferred to the driven pulley 102 is used to operate a conveyor in a feederhouse of a combine harvester to convey harvested crop from an agricultural header into the combine harvester for further processing. In other instances, other types of components or systems that require power to operate can be connected to the driven pulley 104 via the endless belt 110.

In the illustrated example, the driver pulley 102 rotates in the direction of arrow 112, i.e., counterclockwise in the context of FIG. 1. As a result, the endless belt 110 includes a tight side 114 extending between the driver pulley 102 and the driven pulley 104 and a slack side 116 extending between the driver pulley 102 and the driven pulley 104 on a side of the belt drive system 100 opposite the tight side 114. The idler pulley 106 is located on the tight side 114.

The belt drive system 100 also includes a load sensor 118 connected to the idler pulley 106. The load sensor 118 senses a load applied to the idler pulley 106 by the endless belt 110. This sensed load is related to and, thus, indicative of the belt tension in the tight side 114 of the endless belt 110. Thus, with the load sensed by the load sensor 118, the tension in the tight side 114 of the endless belt 110 is determinable. In some implementations, the determined load is used to determine torque or power of the belt drive system. In other implementations, the load is used. Thus, the disclosure encompasses the use of load or torque or power determined using the load.

Figure 2:
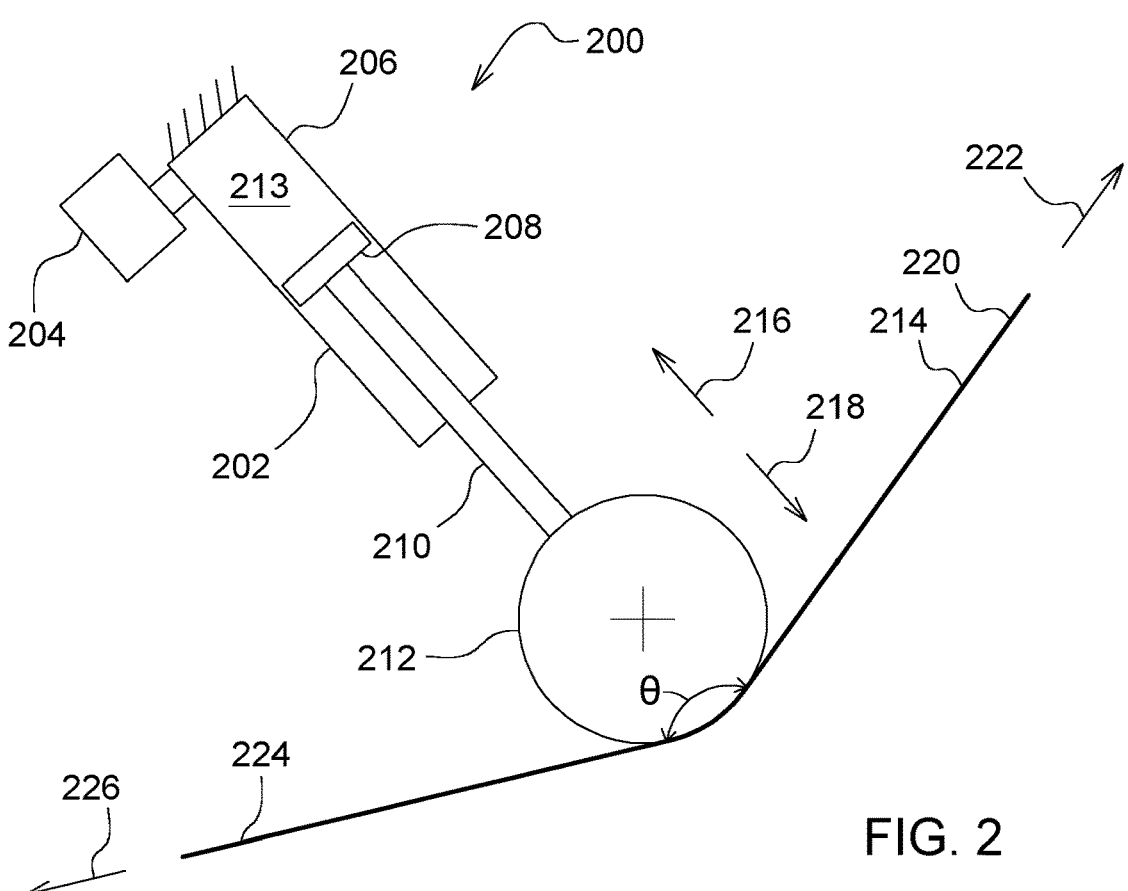
FIG. 2 is a detail view of an example fixed speed belt drive system that shows an example load sensor coupled to an idler pulley, according to some implementations of the present disclosure.

Example sensors within the scope of the load sensor 118 include a hydraulic cylinder that includes a pressure sensor configured to sense a pressure of a hydraulic fluid within the hydraulic cylinder, as shown in FIG. 2. FIG. 2 shows a load sensor 200, which may be similar to load sensor 118, includes a hydraulic cylinder 202 and a pressure sensor 204. The hydraulic cylinder 202 includes a cylinder body 206, a piston 208 movable within the cylinder body 206, and piston rod 210 connected to the piston 208. One of the piston rod 210 or the cylinder body 206 is connected to and idler pulley 212, which may be similar to idler pulley 106, and the other of the piston rod 210 or the cylinder body 206 is fixed (e.g., prevented from movement relative to the driver pulley). Although FIG. 2 shows the cylinder housing 206 as being rigidly fixed, in other implementations, the cylinder housing 206 (or the piston rod 210, whichever the case may be) is fixed at a pinned connection, allowing for a rotation but preventing translation. The pressure sensor 204 senses a pressure of hydraulic fluid 213 inside the cylinder body 206.

In operation, as the tension in an endless belt 214 changes, a load exerted onto the idler pulley 212 also changes. For example, changes in the load on the idler pulley 212 is proportional to the change in the tension of the endless belt 214. As the tension in the endless belt 214 increases, the idler pulley 212 is urged in the direction of arrow 216. With the piston rod 210 connected with the idler pulley 212, the piston rod 210 is also urged in the direction of arrow 216, thereby compressing the hydraulic fluid 213 between the cylinder housing 206 and the piston 208. The pressure sensor 204 senses a pressure of the compressed hydraulic fluid 213. The tension in the endless belt is determinable from the sensed pressure of the hydraulic fluid 213. A reduction in tension in the endless belt 214 causes the idler pulley 212 to be urged in the direction of arrow 218, thereby reducing a pressure applied to the hydraulic fluid 213 by the piston 208. The reduced pressure is also sensed by the pressure sensor 204 and can be used to determine the tension in the endless belt 214. In some instances, a spring may be applied to urge the piston rod 210 in the direction of arrow 218 when a reduction in tension in the endless belt 214 occurs. However, because a hydraulic fluid (i.e., a liquid) is essentially incompressible, the idler pulley 212 and, hence, the piston rod 210 are not actually displaced in the directions of arrows 216 and 218 by an appreciable amount in response to changes in tension in the endless belt 214.

With continued reference to FIG. 2, the endless belt 214 includes a first portion 220 extending away from the idler pulley 212 in a first direction 222 and a second portion 224 extending away from the idler pulley 212 in a section direction 226. The first portion 220 and the second portion 224 define an angle θ. In some implementations, the directions indicated by arrows 216 and 218 on which the piston rod 210 is urged falls on a line that bisects (i.e., equally divides) the angle θ. In other implementations, the line along which the piston rod is urged may be on a line that does not bisect the angle θ.

As explained above, in some implementations, the load sensor 118 includes a hydraulic cylinder and pressure sensor. However, the load sensor 118 includes other types of sensors. For example, in some implementations, the load sensor 118 may include a load cell, a hydraulic pressure transducer, a strain sensor on a component that experiences loading applied by the idler pulley 212 in response to the tension of the endless belt 214, a spring in combination with a linear position sensor, and a spring in combination with a proximity sensor. In some implementations, one or more of these other types of load sensors are oriented such that the load sensor aligns with the line that bisects the angle θ. In other implementations, the load sensors may be aligned in another direction.

Tension in an endless belt, such as endless belts 110 and 214, may increase as a result of an increase in loading applied by the driven pulley, such as driven pulley 104 or 212. This increased loading may occur when the component or system driven by the driven pulley experiences an increase in resistance, for example. For example, in some instances, an example fixed speed belt drive system is used to provide power to a feederhouse drive system of a combine harvester. In some instances, as a speed at which the combine harvester moves through a field during a harvesting operation increases, a flow rate of crop directed to the feederhouse also increases. This increased flow rate of crop increases a load experienced by the feederhouse drive system. As a result, a load experienced by the driven pulley, and, as a result, the tension in the endless belt driving the driven pulley also increases. Therefore, generally, during a harvesting operation, as a speed of the combine harvester increases, the load on the endless belt also increases.

A load increase may also be experienced by the feederhouse drive system even when a speed of the combine harvester remains constant. For example, a crop size distribution or a crop density distribution in a field may vary. Thus, when a combine harvester traveling at a constant speed encounters an increase in an amount of crop, such as by the crop having an increased size or the amount of crop present being greater, the amount of harvested crop entering the feederhouse also increases, causing a load on the feederhouse drive system to increase. Consequently, the tension in the endless belt that transmits power to the feederhouse drive system increases. As the load on the belt drive system increases, an increase in operating speed of the belt drive system may be needed.

Therefore, generally speaking, as the speed of the combine harvester increases, an operating speed of the feederhouse drive system should also be increased in order to accommodate the increase in harvested crop being introduced into the feederhouse. As explained above, because a fixed speed belt drive system has a constant speed ratio, in order to alter an operational speed of the belt drive system, a transmission is used. Shifting of the transmission causes a rotational speed of the driver pulley to change, thereby increasing or decreasing an operating speed of the belt drive system. However, it is desirable to change gears of the transmission when a load being experienced by the belt drive system is within a desired range. Because the load on a belt drive system is commensurate with and, therefore, representative of a tension of the endless belt of the belt drive system, the tension in the endless belt can be used to determine when to change gears of the transmission. Further, using tension in the endless belt as an indicator of a load on the belt drive system and, hence, controlling a speed of the belt drive system to adjust a load on the feederhouse drive system is also beneficial in avoiding damage to the endless belt. Consequently, it is desirable to change a gear setting of a transmission in response to the tension in the endless belt being at or below a selected level, for example. By controlling when shifting occurs in this way to accommodate a change in speed of a combine harvester, shift changes are less abrupt and smoother with reduced wear, thereby reducing abrupt loading changes experienced by the belt drive system, the power source, and driven component or system. As a result, life of the endless belt, other parts of the belt drive system, and the transmission may be improved. Additionally, controlling when shifting occurs, as described herein, can also reduce operator discomfort associated with sudden or harsh shifting.

Figure 3:
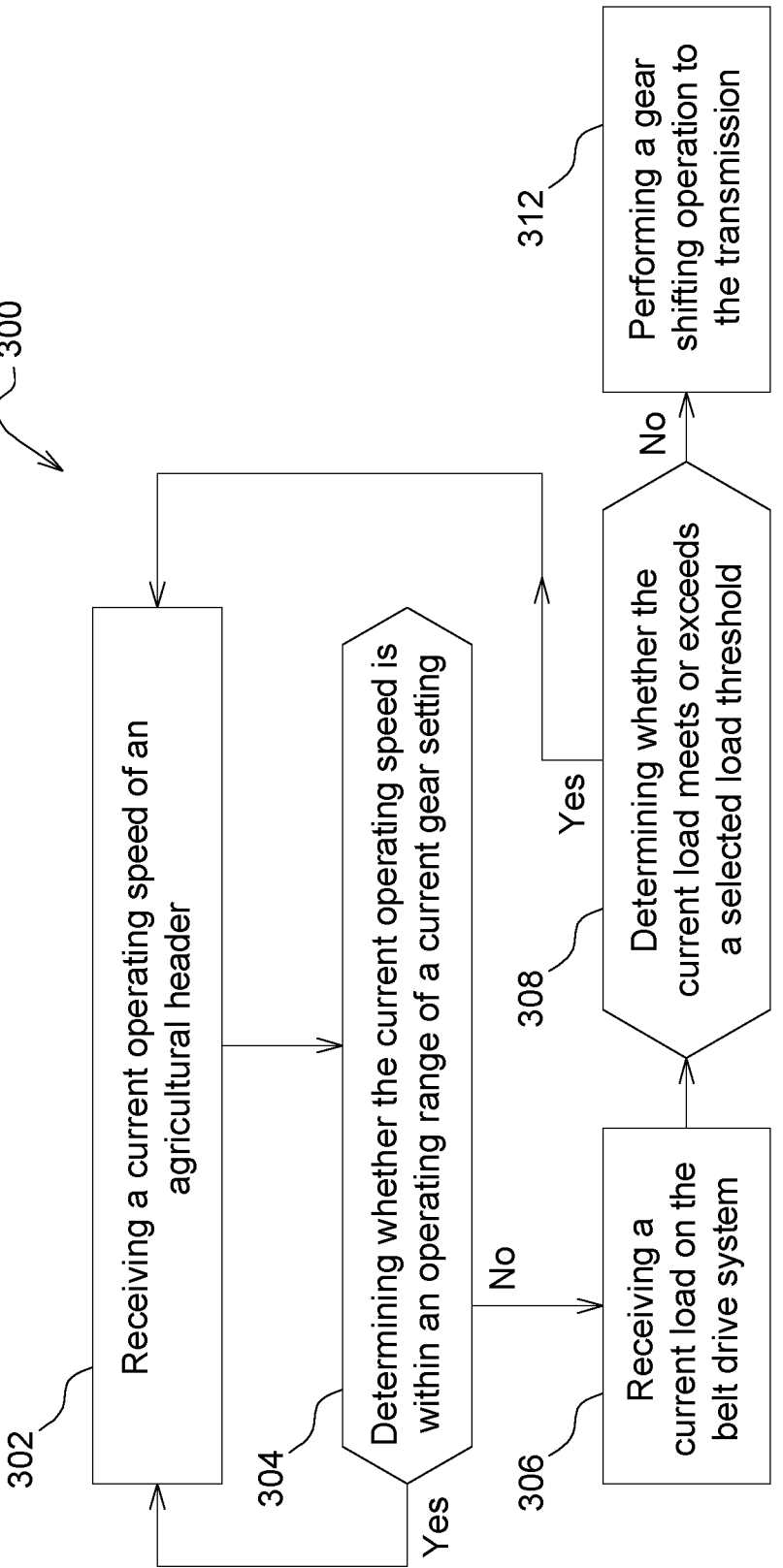
FIG. 3 is a flowchart of an example method for controlling when a transmission gear change occurs for a fixed speed belt drive system, according to some implementations of the present disclosure.

FIG. 3 is a flowchart of an example method 300 for controlling when a transmission gear change occurs for a fixed speed belt drive system. As explained above, controlling when a transmission that drives a fixed speed belt drive system shifts provides for improved shifting performance (e.g., smooth shifting with reduced harshness) and reduced wear of belt drive components, e.g., the endless belt. At 302, a current operating speed of an agricultural header (such as a corn header or draper header) is received. For example, an electronic controller, such as electronic controller 502 (described in more detail below), receives a current operating speed of the agricultural header. The current operating speed of the agricultural header may be sensed by a sensor, such as a speed sensor (e.g., a rotary speed sensor). At 304, a determination is made as to whether the current operating speed of the agricultural header is within an operating range of the current gear setting of a transmission coupled to the belt drive system, such as the fixed speed belt drive system 100. As explained earlier, a transmission is connected to the belt drive system and is used to alter an operating speed of the belt drive system. If the current operating speed is within the operating range of the current gear setting, then the method 300 moves to 302, and the method 300 continues from there. If the current operating speed is not within the operating range of the current operating range of the current gear setting, then the method 300 moves to 306 where a current load on the belt drive system is received. At 308, a determination is made as to whether the current load on the belt drive system meets or exceeds a selected load threshold. If the current load on the belt drive system meets or exceeds the selected load threshold, then a gear shift operation of the transmission is not permitted, and the method 300 moves to 302, where the method 300 continues therefrom. If the current load on the belt drive system is less than the selected load threshold, then a shifting operation of the transmission is performed at 312, which causes a gear setting change to the transmission. As a result, an operating speed of the belt drive system is altered.

In some implementations, determination of the current load on the belt drive system is made using a load sensor, which may be similar to load sensor 118 or 200, that senses a load applied to an idler pulley, which may be similar to idler pulley 106 or 212, provided on a tight side of the belt drive system by an endless belt, such as endless belt 114 or 214, of the belt drive system. As explained earlier, the load applied to the idler pulley is representative of tension in the endless belt of the belt drive system. This belt tension, in turn, is representative of the load on the belt drive system. Generally, the load on the belt drive system is caused by an amount of crop being engaged by the agricultural header. This load on the agricultural header generally increases as the speed of the agricultural combine harvester increases or as the size or amount of the crop being engaged by the head increases (e.g., due to variations in crop size within a field) even when the speed of the combine harvester remains constant. However, a change of load on the agricultural header is usually the result of a change in the speed of the agricultural combine harvester through a field during a harvesting operation.

Figure 4:
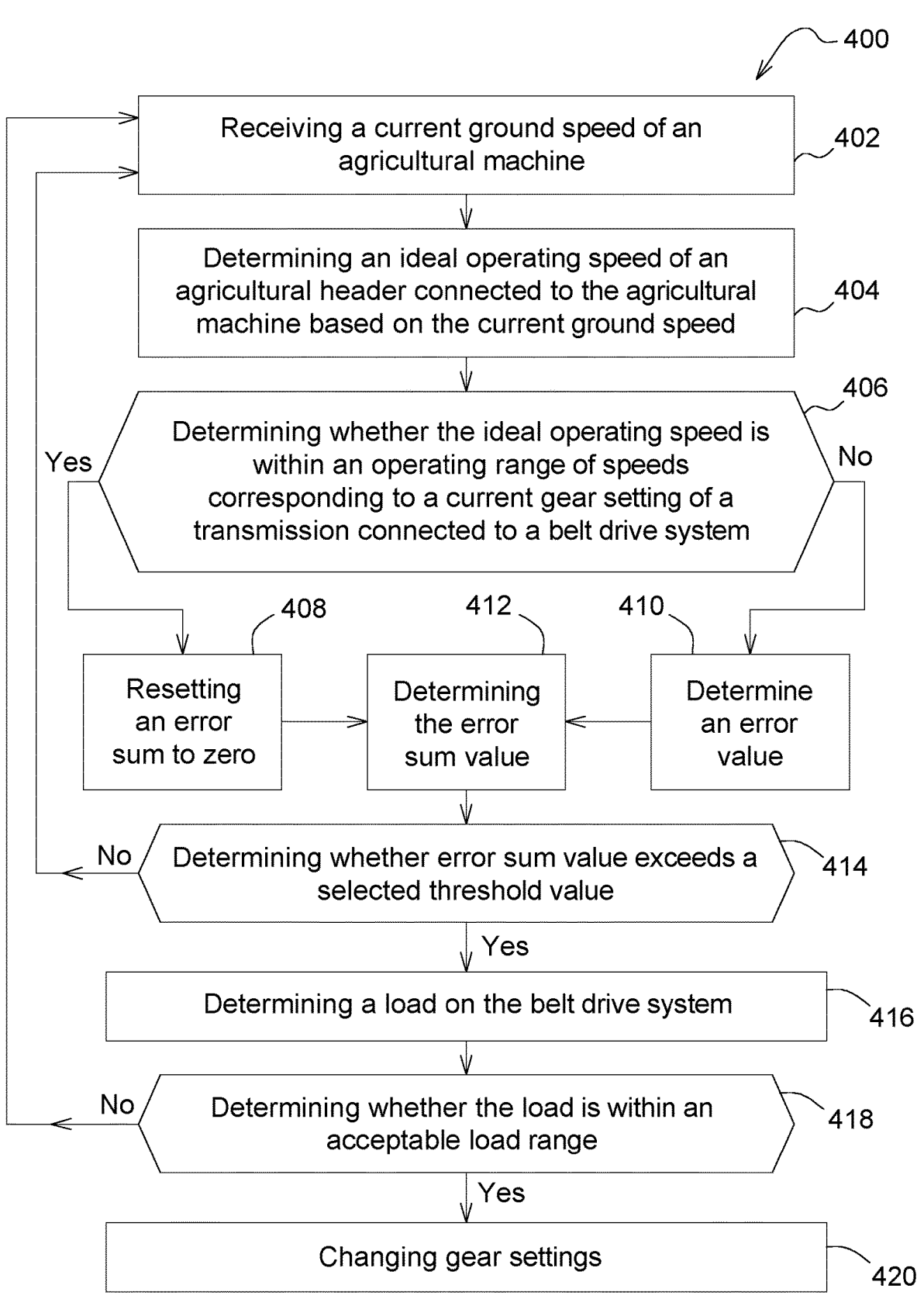
FIG. 4 is a flowchart of another example method for controlling a gear change of a transmission that is connected to a fixed speed belt drive system, according to some implementations of the present disclosure.

FIG. 4 is a flowchart of another example method 400 for controlling a gear change of a transmission that is connected to a belt drive system. In some implementations, the method 400 is applicable to fixed speed belt drive systems. However, in other implementations, the method 400 is applicable to other types of belt drive systems. The following discussion related to FIG. 4 is made in the context of an agricultural harvester. However, the scope of the example method 400 of FIG. 4 encompasses other types of vehicles, such as other types of agricultural vehicles that include or are connectable with an implement. At 402, a current ground speed of an agricultural harvester (i.e., a speed across the ground of the agricultural harvester) is received. The speed of the agricultural harvester may be determined, for example, using a global navigation satellite system (GNSS) or a speed of a transmission of a drivetrain of the agricultural harvester. At 404, an ideal operating speed of an agricultural head connected to the agricultural harvester based on the current ground speed is determined. An operating speed of the agricultural header may be altered based on a change in ground speed of the agricultural harvester. For example, as the ground speed of an agricultural harvester increases through a field during a harvesting operation, the operating speed of the agricultural header is increased in response. The increase in operating speed of the header is needed in order to accommodate an increase in an amount of crop being engaged by the header with the increase in ground speed of the agricultural harvester over the ground. In some instances, an ideal operating speed is an operating speed of the agricultural header at which the agricultural header is operable to handle harvested crop without a problem, such as plugging or accumulation of harvested crop on the agricultural header or at an interface between the agricultural header and the feederhouse of the agricultural harvester, at the speed that the agricultural harvester moves through the field during a harvesting operation. In some instances, the ideal operating speed is determined empirically. In some implementations, the ideal operating speed may be determined using a look up table, a mathematical relationship, a graph of operating speed versus ground speed, or using another approach.

At 406, a determination is made as to whether the ideal operating speed is within a range of operating speeds corresponding to a current gear setting of a transmission connected to and operable to drive the fixed speed belt drive system. For example, the transmission connected to the fixed speed belt drive system includes a plurality of available gear settings, and each gear setting has a range of speeds associated therewith. That is, each gear setting is able to support a range of speeds of operation of the header. In some instances, the ranges of speeds of adjacent gears may overlap. In other instances, no overlap exists for speed ranges for adjacent gear settings. In some implementations, the gear setting is sensed, such as using a gear selection sensor.

If the ideal operating speed is within the range of operating speeds of the current gear setting, then a gear change is not needed, and the method 400 moves to 408 where an error sum value is reset to zero. If the ideal operating speed is outside of the range of operating speeds associated with the current gear setting, then the method moves to 410, where an error value is determined. The error value represents an amount of variance between the ideal operating speed and the range of operating speeds associated with the current gear setting. At 410, the error value is determined based on an amount by which the ideal operating speed is outside of the range of operating speeds associated with the current gear setting. For example, if a range of operating speeds of the current gear setting is 400 revolutions per minute (RPM) to 500 RPM and the ideal operating speed is 350 RPM, then the current ideal operating speed is outside of the range of operating speeds of the current gear setting. In some implementations, determination of the error value is accomplished by taking a difference between the end of the range of operating speeds closest to the ideal operating speed and the ideal operating speed. In this example, the error value is 50 RPM, i.e., 400 RPM minus 350 RPM. If the ideal operating speed were 600 RPM, then the error value would be 100 RPM, i.e., 600 RPM minus 500 RPM. In some implementations, determination of the error may be more involved. For example, the size or magnitude of the determined error value may depend on the absolute difference between the ideal operating speed and the range of operating speeds. In some instances, as the difference between the ideal operating speed and the range of operating speeds increases, the generated error value progressively increases. This progressive increase may be accomplished using a multiplier that is multiplied by the determined difference between the ideal operating speed and the range of operating speeds associated with the current gear setting.

At 412, the error sum value is determined. The error sum value is a summation of the error determined in the present pass through method 400 as well as error values generated in prior passes through the method 400. The method 400 then moves to 414 where the error sum value is compared to a selected threshold value. If the error sum value exceeds the selected threshold value, then a gear setting change is needed.

As can be seen in FIG. 4, if the ideal operating speed is within the range of operating speeds, the error sum value is made equal to zero. The method 400 moves to 412, and the error sum value remains zero notwithstanding any error value generated in a prior pass through the method 400. Thus, when a determination is made that the ideal operating speed is within the range of operating speeds of the current gear setting, then the error sum value is reset to zero.

If a gear setting change is needed, the method moves to 416, where a load on the fixed speed belt drive system is determined. In some instances, the load on the fixed speed belt drive system is determined by determining a tension in an endless belt of the belt drive system, as described earlier. For example, an output of a load sensor, such as load sensor 118 or 200, represents a tension in the endless belt. In some implementations, the output from the load sensor is used to determine the tension in the endless belt, such as with the use of a mathematical formula, look up table, graph, or other approach. At 418, a determination is made as to whether the output from the load sensor (which is representative of the load on the belt drive system) is within an acceptable load range or less than a selected load level. As explained above, the determined load can be used to determine torque or power, and the torque or power can be compared to a corresponding selected torque or power range or a selected torque or power level. In some instances, the acceptable load range is a range a selected by a manufacturer. In some implementations, an acceptable load range or a selected load level is selected to produce a gear change with, for example, a desired smoothness; a selected level of vibration; a selected level of acceleration to the belt drive system, the transmission, the header, or a component of the header; or a combination of these. If the load on the belt drive system is within the acceptable load range, the method 400 moves to 420, where the transmission is shifted to change the gear setting. If the load on the belt drive system is outside of the acceptable load range, a gear setting change is not commanded, and the method returns to 402.

It should be understood that the present disclosure is not limited to the example methods 300 and 400. For example, in some implementations, the methods 300 or 400 may include additional or fewer features. For example, in some implementations, a gear setting of the transmission may be received, and the range of operating speeds associated with the gear setting may be determined, such as using a look up table, algorithm, graph relationship, or another approach.

Figure 5:
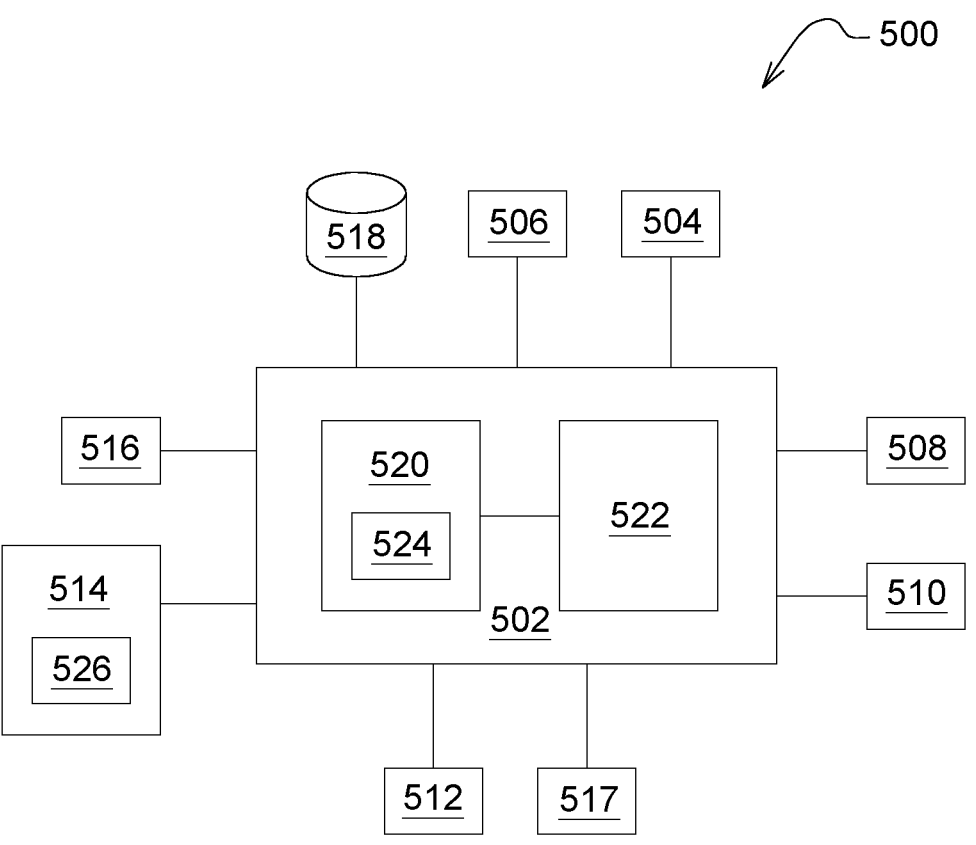
FIG. 5 is a schematic view of an example electronic control system for automatically controlling operation of a transmission that is used to drive a fixed speed belt drive system, according to some implementations of the present disclosure.

FIG. 5 is a schematic view of an example electronic control system 500 for automatically controlling operation of a transmission that is used to drive a fixed speed belt drive system, such as by controlling a gear shifting operation of the transmission. The control system 500 functions to shift a gear setting of the transmission automatically according to methods described herein or otherwise within the scope of the present disclosure, such as according to methods 300 or 400. The control system 500 includes an electronic controller 502, a ground speed sensor 504 of an agricultural machine, such as an agricultural harvester; a GNSS receiver 506; a gear setting sensor 508; an actuator 510 operable to shift a gear setting of a transmission connected to the belt drive system; a load sensor 512; a display 514; an input device 516; and a speed sensor 517 operable to sense a speed of an agricultural header. The ground speed sensor 504 and the GNSS receiver 506 are used to determine a ground speed of the agricultural machine over the ground. Thus, in some implementations, one of the ground speed sensor 504 and the GNSS receiver 506 may be omitted. The controller 502 is operable to control actuation of the actuator 510 to control shifting of the transmission. Shifting of the transmission alters a gear setting and, hence, a rotational speed of the fixed speed belt drive system. The load sensor 512 may be similar to the load sensors 118 or 200 and is used to determine an amount of tension in an endless belt of the fixed speed belt drive system. This belt tension corresponds to, represents, or is indicative of the load being applied to the fixed speed belt drive system.

The speed sensor 517 senses an operating speed of an agricultural header. The speed sensor 517 senses the operating speed of the agricultural header, for example, by sensing a rotational speed of a component of the agricultural header. For example, in some instances, the speed sensor senses a rotational speed of a power take off (PTO) shaft of the agricultural header or some other rotating component of the agricultural header. In other implementations, the speed sensor senses a rotational speed of another component or system that is representative of the operating speed of the agricultural header. For example, in some instances, the speed sensor senses an operating speed of a belt drive system or a speed of a transmission driving the belt drive system at the current gear setting of the transmission. In some instances, the speed sensor senses a rotational speed of a driver pulley, e.g., driver pulley 102.

The control system 500 may also include or be communicably coupled to a remote database 518, which may be in the form of cloud storage, a remote server, or some other type of electronic storage configured to store information.

The various components of the control system 500 are communicably coupled to the controller 502, such as via a wired or wireless connection.

In some implementations, the controller 502 is an electronic computer, such as computer 602 described in more detail below. The controller 502 includes a processor 520 and a memory 522 communicably coupled to the memory processor 520. Additional details of the controller 502, such as processor 520 and memory 522, are described below in the context of computer 602. In some implementations, the controller 502 is communicably coupled with a network, such as in a manner described in more detail below in the context of FIG. 6. The memory 522 communicates with the processor 520 and is used to store programs and other software, information, and data. The processor 520 is operable to execute programs and software and receive information from and send information to the memory 522. Although a single memory 522 and a single processor 520 are illustrated, in other implementations, a plurality of memories, processors, or both may be used. Although the processor 520 and the memory 522 are shown as being local components of the controller 502, in other implementations, one or both of the processor 520 and memory 522 may be located remotely. Software 524, such as in the form of an application or program, is executed by the processor 520 to control operation of the control system 500, as described herein. Particularly, the software 524 includes executable instructions operable to control operation of the various components coupled to the controller 502 and, as a result, control a shifting operation of a transmission to control an operating speed of a fixed speed belt drive system. In some implementations, the software 524 includes instructions to cause the processor 520 to perform method 300 or 500 or another process within the scope of the disclosure to control a shifting operation of a transmission coupled to a belt drive system, such as a fixed speed belt drive system.

The input device 516 is communicably coupled via a wired or wireless connection. Example input devices 516 include a keyboard, keypad, one or more buttons, a slider bar, a dial, a knob, a mouse, or a joystick. The display 514 is communicably coupled to the controller 502 via a wired or wireless connection. The display 514 displays information, such as information related to the operation of control system 500. For example, information displayed by the display 514 may include a gear setting of a transmission connected to a belt drive system, a load on the belt drive system, a ground speed of the agricultural harvester, or other information associated with control system 500 or other aspects of the agriculture harvester. In some instances, the information displayed by the display 514 is displayed via a graphical user interface (GUI) 526. Example displays include cathode ray tubes (CRT), liquid crystal displays (LCDs), or plasma displays. Other types of displays are also within the scope of the present disclosure. In some implementations, the display 514 is a touch screen that is operable to receive input from a user via a user's touch. In some implementations in which the display 514 is a touch screen, the input device 516 may be omitted.

Without in any way limiting the scope, interpretation, or application of the claims appearing below, a technical effect of one or more of the example implementations disclosed herein is improving shifting performance of a transmission connected to a belt drive system. Another technical effect of one or more of the example implementations disclosed herein is reducing wear and a risk of damage to components of a belt drive system or components associated with the belt drive system.

Figure 6:
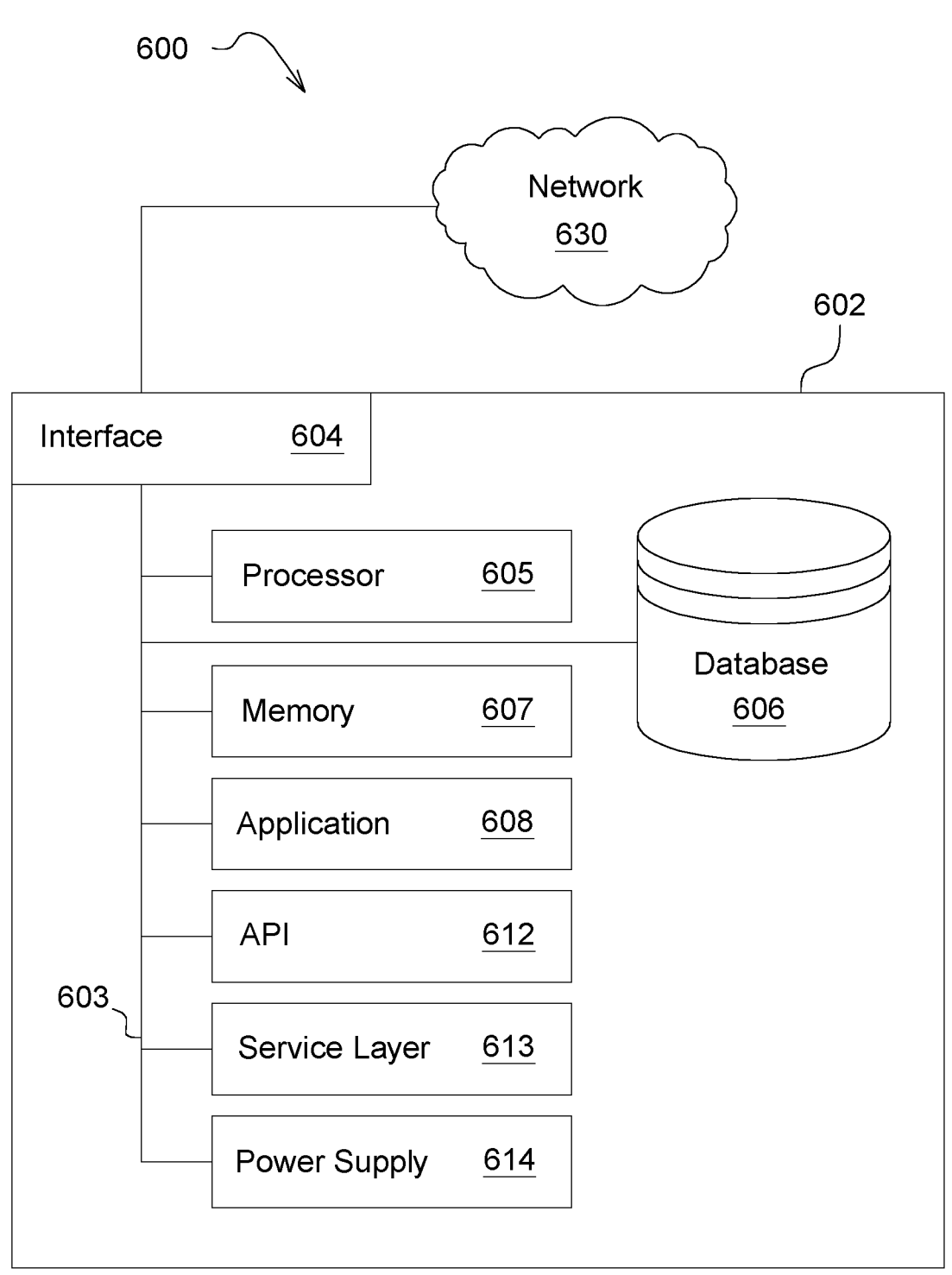
FIG. 6 is a block diagram illustrating an example computer system used to provide computational functionalities associated with described algorithms, methods, functions, processes, flows, and procedures as described in the present disclosure, according to some implementations of the present disclosure.

FIG. 6 is a block diagram of an example computer system 600 used to provide computational functionalities associated with described algorithms, methods, functions, processes, flows, and procedures described in the present disclosure, according to some implementations of the present disclosure. The illustrated computer 602 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. Also, the computer 602 can include output devices that can convey information associated with the operation of the computer 602. The information can include digital data, visual data, audio information, or a combination of information. The information can be presented in a graphical user interface (UI) (or GUI).

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

At a high level, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus 603. In some implementations, any or all of the components of the computer 602, including hardware or software components, can interface with each other or the interface 604 (or a combination of both), over the system bus 603. Interfaces can use an application programming interface (API) 612, a service layer 613, or a combination of the API 612 and service layer 613. The API 612 can include specifications for routines, data structures, and object classes. The API 612 can be either computer-language independent or dependent. The API 612 can refer to a complete interface, a single function, or a set of APIs.

The service layer 613 can provide software services to the computer 602 and other components (whether illustrated or not) that are communicably coupled to the computer 602. The functionality of the computer 602 can be accessible for all service consumers using this service layer. Software services, such as those provided by the service layer 613, can provide reusable, defined functionalities through a defined interface. For example, the interface can be software written in JAVA, C++, or a language providing data in extensible markup language (XML) format. While illustrated as an integrated component of the computer 602, in alternative implementations, the API 612 or the service layer 613 can be stand-alone components in relation to other components of the computer 602 and other components communicably coupled to the computer 602. Moreover, any or all parts of the API 612 or the service layer 613 can be implemented as child or sub-modules of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602 and the described functionality. The interface 604 can be used by the computer 602 for communicating with other systems that are connected to the network 630 (whether illustrated or not) in a distributed environment. Generally, the interface 604 can include, or be implemented using, logic encoded in software or hardware (or a combination of software and hardware) operable to communicate with the network 630. More specifically, the interface 604 can include software supporting one or more communication protocols associated with communications. As such, the network 630 or the interface's hardware can be operable to communicate physical signals within and outside of the illustrated computer 602.

The computer 602 includes a processor 605. Although illustrated as a single processor 605 in FIG. 6, two or more processors 605 can be used according to particular needs, desires, or particular implementations of the computer 602 and the described functionality. Generally, the processor 605 can execute instructions and can manipulate data to perform the operations of the computer 602, including operations using algorithms, methods, functions, processes, flows, and procedures as described in the present disclosure.

The computer 602 also includes a database 606 that can hold data for the computer 602 and other components connected to the network 630 (whether illustrated or not). For example, database 606 can be an in-memory, conventional, or a database storing data consistent with the present disclosure. In some implementations, database 606 can be a combination of two or more different database types (for example, hybrid in-memory and conventional databases) according to particular needs, desires, or particular implementations of the computer 602 and the described functionality. Although illustrated as a single database 606 in FIG. 6, two or more databases (of the same, different, or combination of types) can be used according to particular needs, desires, or particular implementations of the computer 602 and the described functionality. While database 606 is illustrated as an internal component of the computer 602, in alternative implementations, database 606 can be external to the computer 602.

The computer 602 also includes a memory 607 that can hold data for the computer 602 or a combination of components connected to the network 630 (whether illustrated or not). Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 (of the same, different, or combination of types) can be used according to particular needs, desires, or particular implementations of the computer 602 and the described functionality. While memory 607 is illustrated as an internal component of the computer 602, in alternative implementations, memory 607 can be external to the computer 602.

The application 608 can be an algorithmic software engine providing functionality according to particular needs, desires, or particular implementations of the computer 602 and the described functionality. For example, application 608 can serve as one or more components, modules, or applications. Further, although illustrated as a single application 608, the application 608 can be implemented as multiple applications 608 on the computer 602. In addition, although illustrated as internal to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion and management circuits, including recharging, standby, and power management functionalities. In some implementations, the power-supply 614 can include a power plug to allow the computer 602 to be plugged into a wall socket or a power source to, for example, power the computer 602 or recharge a rechargeable battery.

There can be any number of computers 602 associated with, or external to, a computer system containing computer 602, with each computer 602 communicating over network 630. Further, the terms "client," "user," and other appropriate terminology can be used interchangeably, as appropriate, without departing from the scope of the present disclosure. Moreover, the present disclosure contemplates that many users can use one computer 602 and one user can use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

Wireless connections within the scope of the present disclosure include wireless protocols, such as, 802.15 protocols (e.g., a BLUETOOTH®), 802.11 protocols, 802.20 protocols (e.g., WI-FI®), or a combination of different wireless protocols.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. A computer-implemented method for automatically controlling a speed of an agricultural header operably connected to an agricultural machine, the method comprising:
  determining whether a current gear setting of a transmission configured to drive the agricultural header is appropriate for an operating condition of the agricultural header;
  determining a load condition on the agricultural header;
  determining whether the load condition is an acceptable load condition; and
  changing a gear setting of the transmission based on the current gear setting being outside of an appropriate operating range and based on the load condition being the acceptable load condition.

2. The computer-implemented method of claim 1, wherein determining whether the current gear setting of the transmission configured to drive the agricultural header is appropriate for the operating condition of the agricultural header includes:

receiving, from a speed sensor, a current ground speed of the agricultural machine; and determining an ideal operating speed of the agricultural header based on the current ground speed of the agricultural machine.

3. The computer-implemented method of claim 2, wherein determining whether the current gear setting of the transmission configured to drive the agricultural header is appropriate for the operating condition of the agricultural header includes:

determining a range of operating speeds corresponding to a current gear setting of the transmission; and determining whether the ideal operating speed is within the range of operating speeds.

4. The computer-implemented method of claim 3, further comprising:

determining an error value representative of an amount by which the ideal operating speed is outside of the range of operating speeds in response to the ideal operating speed being outside the range of the operating speeds; and determining a new error sum value by summing the determined error value with a current error sum value.

5. The computer-implemented method of claim 4, further comprising determining that a gear setting change is needed when the new error sum value exceeds a selected value.

6. The computer-implemented method of claim 3, further comprising determining that a gear setting change is not needed when the ideal operating speed is within the range of operating speeds.

7. The computer-implemented method of claim 1, wherein determining a load condition of the agricultural header comprises determining a tension in an endless belt of a belt drive system operably coupled to the transmission.

8. The computer-implemented method of claim 7, wherein determining the tension in an endless belt of a belt drive system operably coupled to the transmission comprises determining a load applied to an idler pulley of the belt drive system by the endless belt.

9. The computer-implemented method of claim 8, wherein determining the load applied to the idler pulley of the belt drive system by the endless belt comprises sensing a fluid pressure of hydraulic fluid within a hydraulic cylinder connected to the idler pulley.

10. The computer-implemented method of claim 1, wherein changing the gear setting of the transmission based on the current gear setting being outside of the appropriate operating range and based on the load condition being the acceptable load condition comprises changing the gear setting of the transmission in response to a determination that an ideal operating speed of the transmission being outside of a range of operating speeds of a current gear setting of the transmission and a load condition of the agricultural header being less than a selected load level.

11. A computer-implemented apparatus for automatically controlling a speed of an agricultural header operably connected to an agricultural machine, the apparatus comprising:

one or more processors; and a non-transitory computer-readable storage medium coupled to the one or more processors and storing programming instructions for execution by the one or more processors, the programming instructions instruct the one or more processors to:

determine whether a current gear setting of a transmission configured to drive the agricultural header is appropriate for an operating condition of the agricultural header;

determine a load condition on the agricultural header;

determine whether the load condition is an acceptable load condition; and change a gear setting of the transmission based on the current gear setting being outside of an appropriate operating range and based on the load condition being the acceptable load condition.

12. The computer-implemented apparatus of claim 11, wherein the programming instructions to instruct the one or more processors to determine whether the current gear setting of the transmission configured to drive the agricultural header is appropriate for the operating condition of the agricultural header includes programming instructions to instruct the one or more processors to:

receive, from a speed sensor, a current ground speed of the agricultural machine; and determine an ideal operating speed of the agricultural header based on the current ground speed of the agricultural machine.

13. The computer-implemented apparatus of claim 12, wherein the programming instructions to instruct the one or more processors to determine whether the current gear setting of the transmission configured to drive the agricultural header is appropriate for the operating condition of the agricultural header includes programming instructions to instruct the one or more processors to:

determine a range of operating speeds corresponding to a current gear setting of the transmission; and determine whether the ideal operating speed is within the range of operating speeds.

14. The computer-implemented apparatus of claim 13, wherein the programming instructions further instruct the one or more processors to:

determine an error value representative of an amount by which the ideal operating speed is outside of the range of operating speeds in response to the ideal operating speed being outside the range of the operating speeds; and determine a new error sum value by summing the determined error value with a current error sum value.

15. The computer-implemented apparatus of claim 14, wherein the programming instructions further instruct the one or more processors to determine that a gear setting change is needed when the new error sum value exceeds a selected value.

16. The computer-implemented apparatus of claim 13, wherein the programming instructions further instruct the one or more processors to determine that a gear setting change is not needed when the ideal operating speed is within the range of operating speeds.

17. The computer-implemented apparatus of claim 11, wherein the programming instructions that instruct the one or more processors to determine a load condition of the agricultural header includes programming instructions that instruct the one or more processors to determine a tension in an endless belt of a belt drive system operably coupled to the transmission.

18. The computer-implemented apparatus of claim 17, wherein the programming instructions that instruct the one or more processors to determine the tension in an endless belt of a belt drive system operably coupled to the transmission includes programming instructions that instruct the one or more processors to determine a load applied to an idler pulley of the belt drive system by the endless belt.

19. The computer-implemented apparatus of claim 18, wherein the programming instructions that instruct the one or more processors to determine the load applied to the idler pulley of the belt drive system by the endless belt includes programming instructions that instruct the one or more processors to sense a fluid pressure of hydraulic fluid within a hydraulic cylinder connected to the idler pulley.

20. The computer-implemented apparatus of claim 11, wherein the programming instructions that instruct the one or more processors to change the gear setting of the transmission based on the current gear setting being outside of the appropriate operating range and based on the load condition being the acceptable load condition includes programming instructions that instruct the one or more processors to change the gear setting of the transmission in response to a determination that an ideal operating speed of the transmission being outside of a range of operating speeds of a current gear setting of the transmission and a load condition of the agricultural header being less than a selected load level.

\*  \*  \*  \*  \*